US009853598B2

(12) United States Patent
Wu et al.

(10) Patent No.: US 9,853,598 B2
(45) Date of Patent: Dec. 26, 2017

(54) SOLAR MODULE FRAME

(71) Applicant: NEO SOLAR POWER CORP., Hsinchu (TW)

(72) Inventors: Meng-Hsiu Wu, Hsinchu (TW); Hung-Yang Lin, Hsinchu (TW); Chien-Liang Chen, Hsinchu (TW); Ching-Huang Lin, Hsinchu (TW); Chang-Kuei Chung, Hsinchu (TW); Sen-Hsiang Hung, Hsinchu (TW)

(73) Assignee: NEO SOLAR POWER CORP., Hsinchu (TW)

( * ) Notice: Subject to any disclaimer, the term of this patent is extended or adjusted under 35 U.S.C. 154(b) by 473 days.

(21) Appl. No.: 14/491,166

(22) Filed: Sep. 19, 2014

(65) Prior Publication Data

US 2015/0372637 A1 Dec. 24, 2015

(30) Foreign Application Priority Data

Jun. 20, 2014 (TW) .............................. 103121474 A

(51) Int. Cl.
*H02S 30/10* (2014.01)
(52) U.S. Cl.
CPC ..................................... *H02S 30/10* (2014.12)
(58) Field of Classification Search
CPC .... H02S 30/10; H01L 31/0424; H01L 31/048
USPC ........................................................ 52/173.3
See application file for complete search history.

(56) References Cited

U.S. PATENT DOCUMENTS

| 4,205,486 A * | 6/1980 | Guarnacci | E06B 3/205 403/231 |
| 4,555,869 A * | 12/1985 | Kenkel | E06B 3/9641 49/449 |
| 7,487,771 B1 * | 2/2009 | Eiffert | F24J 2/5211 126/621 |
| 2008/0172955 A1 | 7/2008 | McClintock et al. | |
| 2010/0275977 A1 * | 11/2010 | Kinard | H01L 31/02008 136/251 |

(Continued)

FOREIGN PATENT DOCUMENTS

| CN | 102237413 A | 11/2011 |
| CN | 204013364 U | 12/2014 |

(Continued)

OTHER PUBLICATIONS

Chinese Patent Office, Office Action dated Dec. 28, 2016.

*Primary Examiner* — Paola Agudelo
(74) *Attorney, Agent, or Firm* — Rabin & Berdo, P.C.

(57) ABSTRACT

A solar module frame includes two first borders and two second borders. At least one first border includes a first segment and a second segment, where one end of the first segment is connected to one end of the second border, and one end of the second segment is connected to one end of the other second border. The solar module frame includes at least one connection component. One end of the connection component is connected to the other end of the first segment, and the other end of the connection component is connected to the other end of the second segment. Each of the first segment, the second segment, and the connection component includes an external wall, a support wall, a first clamping wall, and a second clamping wall. Each of the first segment and the second segment includes an internal wall.

15 Claims, 8 Drawing Sheets

(56) References Cited

U.S. PATENT DOCUMENTS

| | | | | |
|---|---|---|---|---|
| 2012/0222726 A1* | 9/2012 | Qin | ........................ | H02S 40/34 |
| | | | | 136/251 |
| 2012/0260976 A1* | 10/2012 | Suzuki | ................ | H01L 31/0422 |
| | | | | 136/251 |
| 2013/0019857 A1* | 1/2013 | Li | ...................... | H01L 31/0424 |
| | | | | 126/569 |
| 2014/0352763 A1* | 12/2014 | Chen | .................... | F24J 2/5211 |
| | | | | 136/251 |
| 2015/0090678 A1* | 4/2015 | Hsu | ...................... | H01L 31/048 |
| | | | | 211/26 |
| 2015/0107651 A1* | 4/2015 | Cinnamon | ............. | H02S 40/36 |
| | | | | 136/251 |

FOREIGN PATENT DOCUMENTS

| | | | |
|---|---|---|---|
| JP | 2005-009286 A | 1/2005 | |
| JP | 2005-240352 A | 9/2005 | |
| JP | 2010-270547 A | 12/2010 | |
| JP | 2011-029454 A | 2/2011 | |
| JP | 2011029519 A | 2/2011 | |
| JP | 2011526425 A | 10/2011 | |
| JP | 2012174832 A | 9/2012 | |
| JP | 2012253184 A | 12/2012 | |
| JP | 2013526064 A | 6/2013 | |
| KR | 20120140250 A | 12/2012 | |
| WO | WO-2010-019742 A2 | 2/2010 | |
| WO | WO-2011132211 A1 | 10/2011 | |
| WO | WO 2011139648 A2 * | 11/2011 | ....... H01L 31/02013 |
| WO | WO-2014039483 A1 | 3/2014 | |

\* cited by examiner

SOLAR MODULE FRAME

CROSS-REFERENCES TO RELATED APPLICATIONS

This non-provisional application claims priority under 35 U.S.C. §119(a) on Patent Application No. 103121474 filed in Taiwan, R.O.C. on 2014 Jun. 20, the entire contents of which are hereby incorporated by reference.

BACKGROUND

Technical Field

The present invention relates to a frame applied to a solar module, and particularly, to a lightweight solar module frame having heat dissipation and ventilation functions.

Related Art

With the development of science and technology, demand for energy increases with each passing day. However, energy sources on the Earth are limited; therefore, people from all over the world are dedicated to development of alternative energy, among which the development of solar power generation conforming to the appeal of environment protection is most popular.

To maintain a high weight bearing capacity and a pressure resisting capability of a solar module, a conventional solar module frame is formed by four integrally formed metal borders, and shapes of the four borders are substantially the same; consequently, the frame is heavy, and thus is inconvenient to deliver, install, and repair. Therefore, the border structure needs to be modified, so as to effectively reduce the weight of the borders while maintaining a high weight bearing capacity and a pressure resisting capability. In addition, the solar module is disposed at a place exposed to the sun, and converts received light energy into electric power for use. However, the conventional photoelectric conversion efficiency is low, and most light energy is converted into heat energy; moreover, the solar module is exposed to the sun for a long time, causing the solar module to operate at a very high temperature, and therefore power of the solar module decreases as the temperature increases. Besides, the conventional solar module has a large area, and the length may reach one meter; generally, solar modules are disposed in the form of an array on the ground (or the roof) by using the solar module frame, and are at a certain distance from the ground (or the roof). However, the solar module is very close to the ground (or the roof); therefore, heat energy at the bottom of the solar module cannot be effectively dissipated and the bottom is overheating, which further causes problems of a decrease in conversion efficiency of the solar module, a decline in the service life thereof, and even burnout of elements.

SUMMARY

In view of this, the present invention provides a solar module frame using a composite structure, where at least one border of the solar module frame is formed by two segments and one connection component, and structures and/or materials of the two segments and the connection component are different, so as to reduce an overall weight of the frame and maintain a certain level of strength. An opening may further be provided on the connection component, so that air at the back of the solar module can communicate with ambient air through the opening, thereby solving the heat dissipation problem, and further improving power generation efficiency of the solar module. In addition, only a part of the original frame is changed to be made of a material having workability, that is, borders and a connection component that are made of different materials are used to form the solar module frame; therefore, the solar module frame has the advantage of workability, and maintains mechanical strength of the original frame.

One concept of the present invention is a solar module frame, including two first borders and two second borders. The two first borders are opposite to each other, and the two second borders are also opposite to each other. In addition, at least one first border of the solar module frame includes a first segment and a second segment, where one end of the first segment is connected to one end of one second border, and one end of the second segment is connected to one end of the other second border. Besides, the solar module frame includes at least one connection component. The connection component includes a first connection end and a second connection end that are opposite to each other. The first connection end of the connection component is connected to the other end of the first segment, and the second connection end of the connection component is connected to the other end of the second segment. Each of the first segment, the second segment, and the connection component includes an external wall, a support wall, a first clamping wall, and a second clamping wall. The external wall has a first side edge and a second side edge parallel to the first side. The support wall is connected to the first side edge and is perpendicular to the external wall. The first clamping wall is connected to the second side edge and is perpendicular to the external wall. The second clamping wall is perpendicularly connected to the external wall, is parallel to the first clamping wall, and is at a certain distance from the first clamping wall. Each of the first segment and the second segment further includes an internal wall. The internal wall is perpendicularly connected to the second clamping wall and the support wall, is parallel to the external wall, and is at a certain distance from the external wall.

In conclusion, in the solar module frame according to the present invention, with the workability of a connection component, an opening is provided, so that the problem of heat dissipation at the back of the solar module is solved, and power generation efficiency of the solar module is improved. In addition, in the solar module frame according to the present invention, a connection component having workability is used to replace a part of the original frame; therefore, mechanical strength of the original frame can be maintained. Besides, in the connection component of the solar module frame according to the present invention, a single-wall structure or a double-wall structure in combination with material replacement is used to achieve effects of maintaining the frame strength and saving manufacturing costs.

The features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

DETAILED DESCRIPTION

Figure 1:
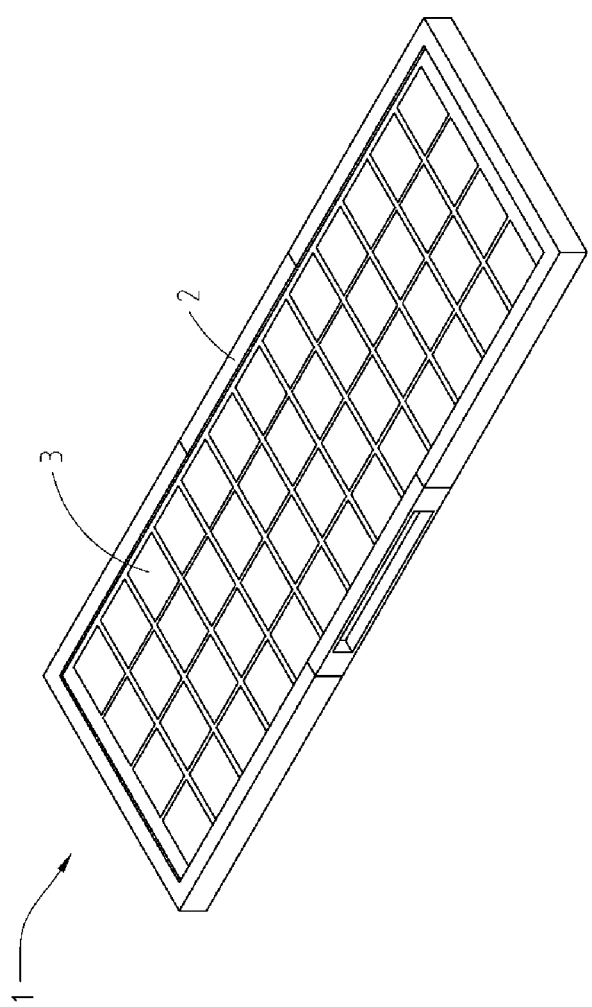
FIG. 1 is a schematic three-dimensional view of a solar module frame according to an embodiment of the present invention.
Figure 2:
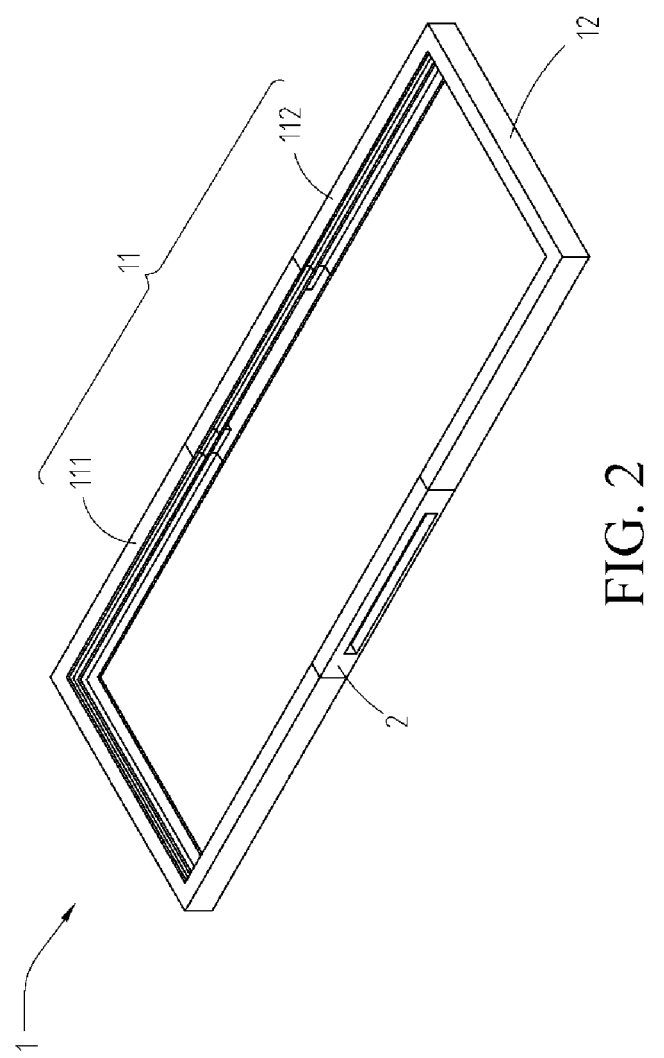
FIG. 2 is another schematic three-dimensional view of a solar module frame according to an embodiment of the present invention.
Figure 3:
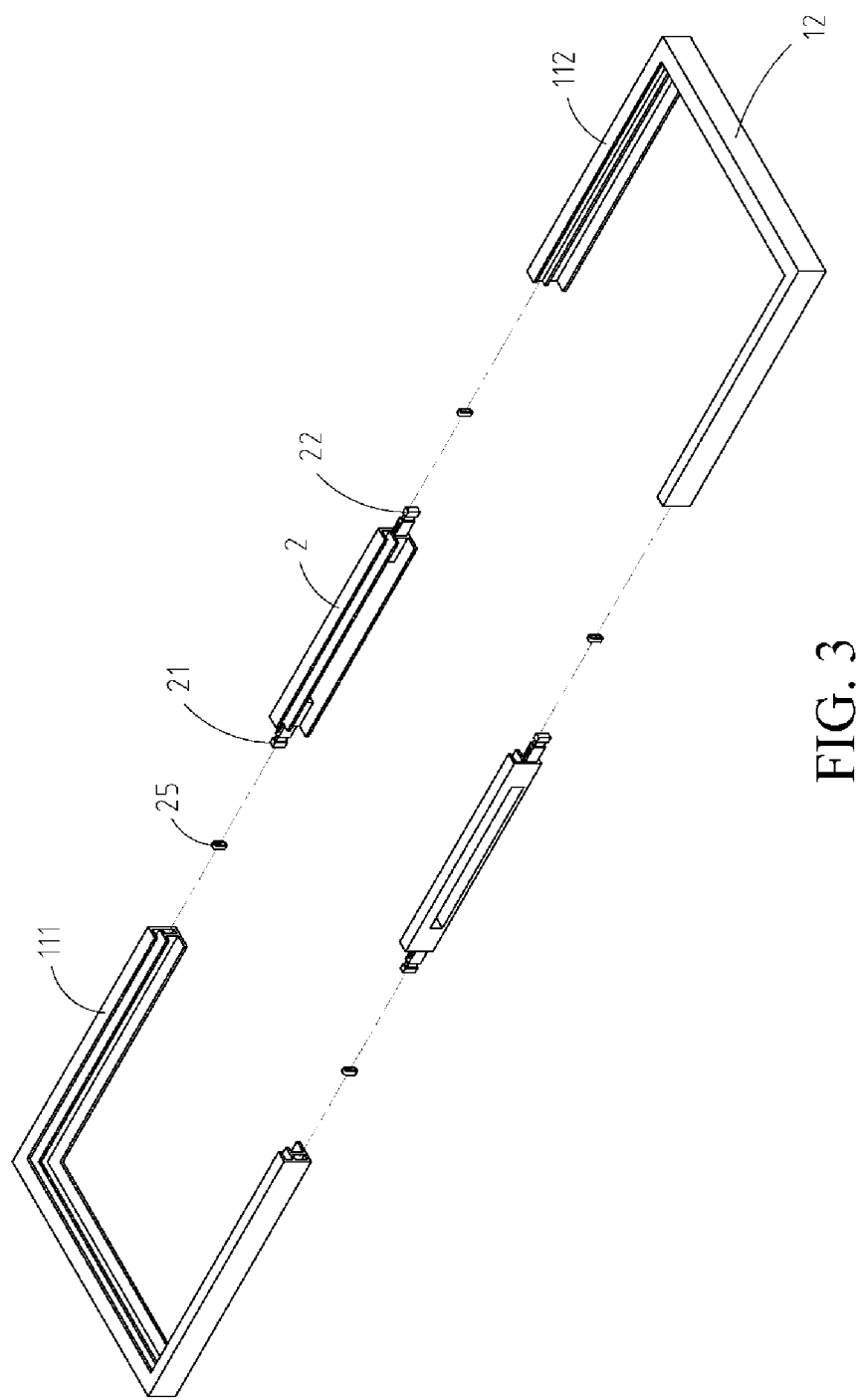
FIG. 3 is a schematic three-dimensional exploded view of a solar module frame according to an embodiment of the present invention.

A solar module framework 1 is disclosed, where FIG. 1 is a schematic three-dimensional view of the solar module frame according to an embodiment of the present invention, FIG. 2 is another schematic three-dimensional view of the solar module frame according to an embodiment of the present invention, and FIG. 3 is a schematic three-dimensional exploded view of the solar module frame according to an embodiment of the present invention.

The solar module frame 1 in this embodiment includes two first borders 11 opposite to each other and two second borders 12 opposite to each other. At least one first border 11 includes a first segment 111 and a second segment 112. One end of the first segment 111 is connected to one end of one second border 12, and one end of the second segment 112 is connected to one end of the other second border 12. In this embodiment, both the first border 11 and the second border 12 are of a double-wall structure, and space is formed between two walls. A conventional L-shaped corner joint piece (not shown in the figure) may be inserted into space of the first border 11 and space of the second border 12, so that the first border and the second border are fixedly connected. In another embodiment, the first segment 111 and the second segment 112 may be fixedly connected to the second borders 12 by using locking pieces. When the first segment 111 and the second segment 112 of the first border 11 are fixedly connected to the second borders 12 by using the locking pieces, a locking hole fitting the locking piece is provided on the first border 11 and/or the second border 12. In another embodiment, when the first border 11 is of a double-wall structure and the second border 12 is of a single-wall structure, the first border 11 and the second border 12 may be fixedly connected by using a modified L-shaped corner joint piece. The modified L-shaped corner joint piece has functions of insertion and clamping, where one end thereof may be inserted into space formed by the double-wall structure of the first border 11, and the other end has a clamping arm which can clamp a single-wall piece of the second border 12, so that the first border 11 is fixedly connected to the second border 12. Therefore, in the solar module frame 1 according to the present invention, strength at four corners is not reduced as the border structure or material changes. A material of the corner joint piece may be metal, plastic, glass, ceramic, carbon fiber, or a combination thereof, and at least one protrusion, depression, or roughened structure may be provided on a surface of the corner joint piece, to reduce sliding between the frame and the corner joint piece.

Referring to FIG. 3, each of the two first borders 11 includes a first segment 111 and a second segment 112. The first segments 111 of the first borders 11 are connected to two ends of a same second border 12 respectively, and the second segments 112 of the first borders 11 are connected to two ends of the other second border 12 respectively, so as to form two U-shaped frame parts that are substantially the same. Materials of the two U-shaped frame parts are metal, so as to provide a sufficient mechanical weight bearing capacity, but the present invention is not limited thereto. In another embodiment, materials of the first segments 111 and the second segments 112 of the first borders 11 may be plastic, glass, ceramic, carbon fiber, or a combination thereof.

Figure 4:
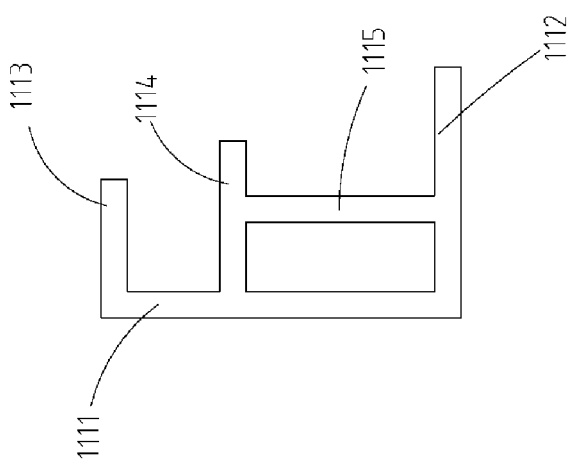
FIG. 4 is a schematic side section view when a first segment or a second segment is of a double-wall structure according to the present invention.

In addition, in this embodiment, the first segment 111 and the second segment 112 are borders of a double-wall structure, as shown in FIG. 4. Because structures of the first segment 111 and the second segment 112 are substantially the same, the following only uses the first segment 111 as an example for description. The first segment 111 of a double-wall structure is described as follows.

The first segment 111 includes an external wall 1111, a support wall 1112, a first clamping wall 1113, a second clamping wall 1114, and an internal wall 1115. The external wall 1111 of the first segment 111 has a first side edge and a second side edge parallel to the first side edge. The support wall 1112 is perpendicularly connected to the first side edge of the external wall 1111, and the first clamping wall 1113 is perpendicularly connected to the second side edge of the external wall 1111. The second clamping wall 1114 is perpendicularly connected to the external wall 1111, is parallel to the first clamping wall 1113, and is at a certain distance from the first clamping wall 1113, that is, the second clamping wall 1114 is disposed between the first clamping wall 1113 and the support wall 1112. In addition, the support wall 1112, the first clamping wall 1113, and the second clamping wall 1114 of the first segment 111 extend in a same direction. Two opposite sides of the internal wall 1115 are connected to the second clamping wall 1114 and the support wall 1112 respectively, and are perpendicular to the second clamping wall 1114 and the support wall 1112. Besides, the internal wall 1115 is parallel to the external wall 1111, and is at a certain distance from the external wall 1111.

In the foregoing description, the support wall 1112 contacts a placement plane of the solar module frame 1, and supports an overall weight. The first clamping wall 1113 and the second clamping wall 1114 are used for clamping solar modules 3; therefore, a distance between the first clamping wall 1113 and the second clamping wall 1114 depends on the thickness of the solar modules 3.

Because in the solar module frame in this embodiment, at least one first border 11 includes a first segment 111 and a second segment 112, and the two segments are independent components, at least one connection component 2 needs to be disposed to connect the two segments, so as to form a complete frame. Therefore, the solar module frame 1 in this embodiment includes at least one connection component 2. A material used in the connection component 2 is plastic, but the present invention is not limited thereto, and the connection component 2 may be made of glass, ceramic, carbon fiber, or a combination thereof, or the like. Because the connection component 2 in this embodiment is made of plastic, the connection component 2 has a feature of workability, and an injection molding process can be used, so that the connection component 2 is an integrally formed structure; however, the present invention is not limited thereto.

As described above, in FIG. 3, that each of the two first borders 11 includes a first segment 111 and a second segment 112 is used as an example; therefore, two connection components 2 need to be disposed, so that the first segment 111 of each first border 11 can be connected to the second segment 112 of each first border 11 by using the connection component 2, to form a complete solar module frame 1.

Figure 5B:
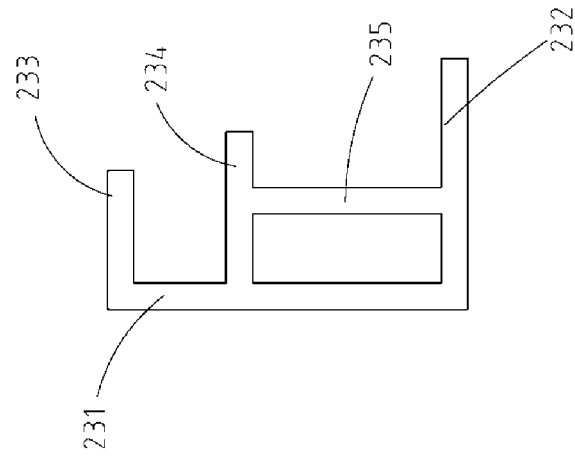
FIG. 5B is a schematic side section view when a connection component is of a double-wall structure according to the present invention.
Figure 5A:
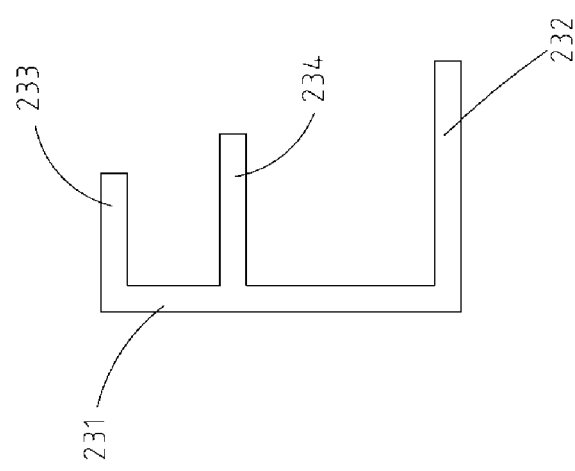
FIG. 5A is a schematic side section view when a connection component is of a single-wall structure according to the present invention.

The connection component 2 includes a first connection end 21 and a second connection end 22 that are opposite to each other. The first connection end 21 is connected to the other end of the first segment 111 of the first border 11, and the second connection end 22 is connected to the other end of the second segment 112 of the first border 11. In addition, the connection component 2 in this embodiment may be of a single-wall structure or a double-wall structure, as shown in FIG. 5A and FIG. 5B respectively. The descriptions are as follows.

Figure 6:
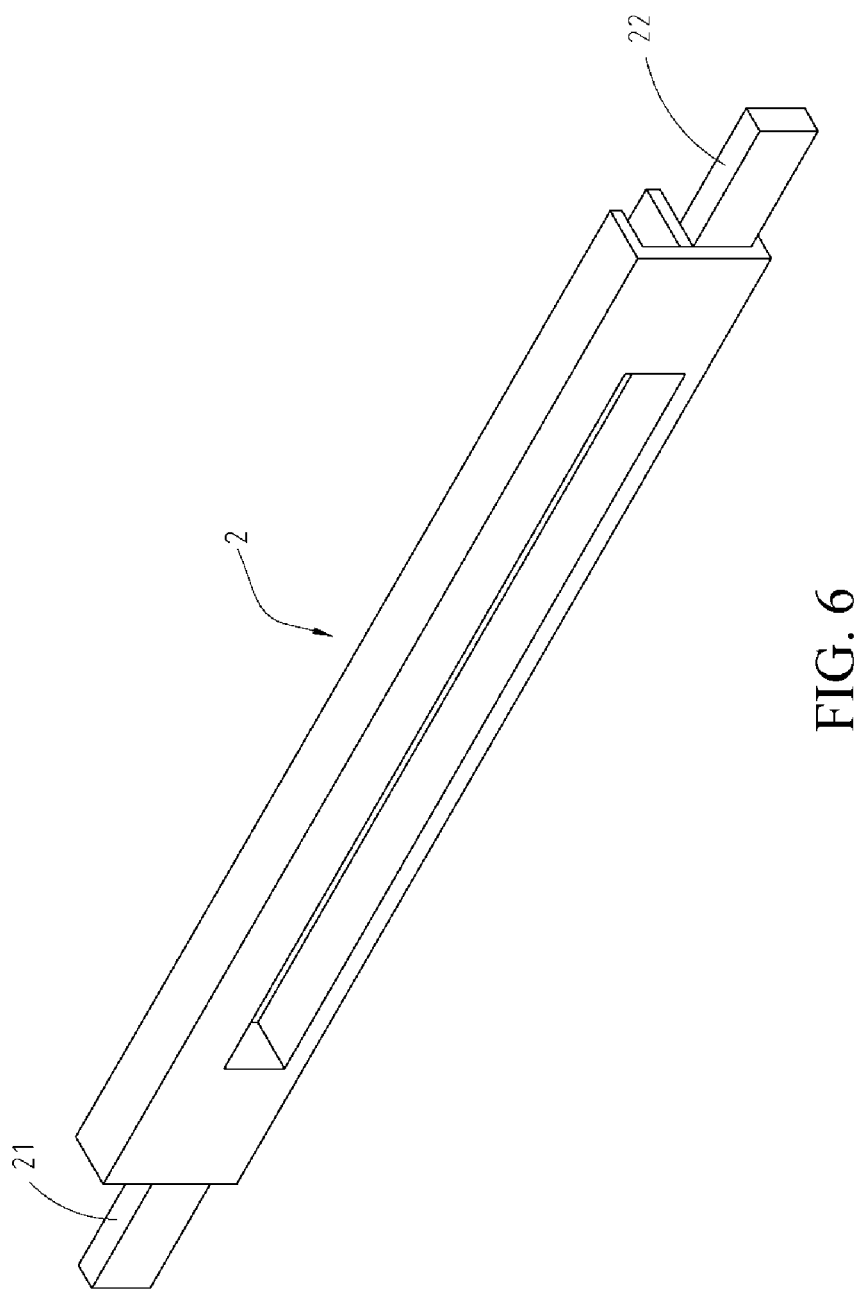
FIG. 6 is a schematic three-dimensional view of a first embodiment of a connection component according to the present invention.
Figure 7A:
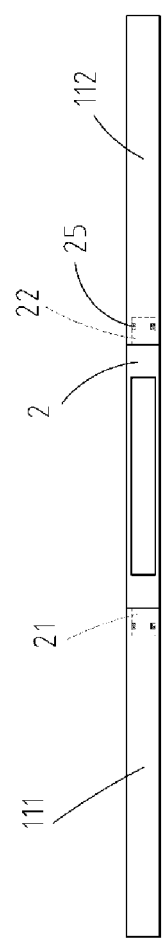
FIG. 7A is a schematic view of a first pattern of an opening of a connection component according to the present invention.
Figure 7B:
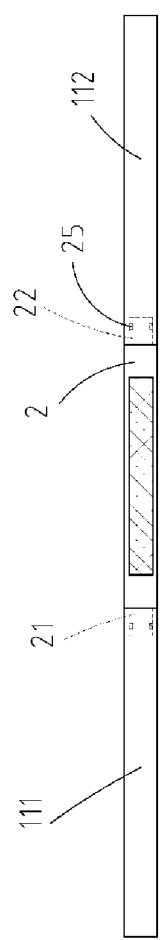
FIG. 7B is a schematic view of a second pattern of an opening of a connection component according to the present invention.
Figure 7C:
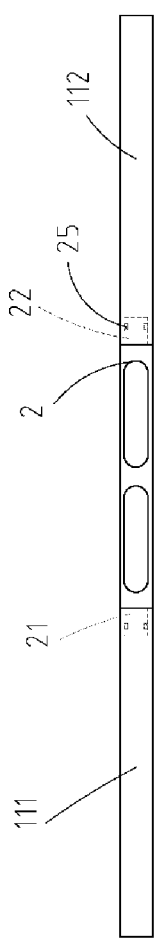
FIG. 7C is a schematic view of a third pattern of an opening of a connection component according to the present invention.
Figure 7D:
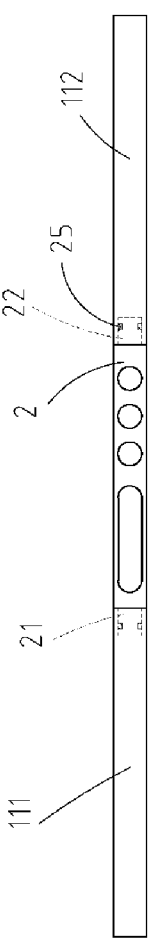
FIG. 7D is a schematic view of a fourth pattern of an opening of a connection component according to the present invention.

First, the connection component 2 of a single-wall structure is described. Referring to FIG. 5A and FIG. 6, FIG. 6 is a schematic three-dimensional view of a first embodiment of the connection component according to the present invention. The connection component 2 further includes an external wall 231, a support wall 232, a first clamping wall 233, and a second clamping wall 234. The external wall 231 of the connection component 2 has a first side edge and a second side edge parallel to the first side. The support wall 232 of the connection component 2 is perpendicularly connected to the first side edge of the external wall 231, and the first clamping wall 233 is perpendicularly connected to the second side edge of the external wall 231. The second clamping wall 234 is perpendicularly connected to the external wall 231, is parallel to the first clamping wall 233, and is at a certain distance from the first clamping wall 233, that is, the second clamping wall 234 is disposed between the first clamping wall 233 and the support wall 232. In addition, the support wall 232, the first clamping wall 233, and the second clamping wall 234 of the connection component 2 extend in a same direction.

In the foregoing description, the support wall 232 contacts a placement plane of the solar module frame 1, and supports an overall weight. The first clamping wall 233 and the second clamping wall 234 are used for clamping solar modules 3; therefore, a distance between the first clamping wall 233 and the second clamping wall 234 depends on the thickness of the solar modules 3.

Furthermore, the external wall 231, the support wall 232, the first clamping wall 233, and the second clamping wall 234 of the connection component 2 are located between the first connection end 21 and the second connection end 22. In addition, the external wall 231 of the connection component 2 abuts and is connected to the external wall 1111 of the first segment 111 or the second segment 112. The support wall 232 of the connection component 2 abuts and is connected to the support wall 1112 of the first segment 111 or the second segment 112. The first clamping wall 233 abuts and is connected to the first clamping wall 1113 of the first segment 111 or the second segment 112, and the second clamping wall 234 of the connection component 2 abuts and is connected to the second clamping wall 1114 of the first segment 111 or the second segment 112.

Referring to FIG. 5B and FIG. 6, the double-wall structure of the connection component 2 is essentially the foregoing single-wall structure added with an internal wall 235. Two opposite sides of the internal wall 235 of the connection component 2 are connected to the second clamping wall 234 and the support wall 232 of the connection component 2, and are perpendicular to the second clamping wall 234 and the support wall 232 of the connection component 2. Besides, the internal wall 235 of the connection component 2 is parallel to the external wall 231 of the connection component 2, and is at a certain distance from the external wall 231. Furthermore, the same as the external wall 231, the support wall 232, the first clamping wall 233, and the second clamping wall 234 of the connection component 2 described above, the internal wall 235 of the connection component 2 is located between the first connection end 21 and the second connection end 22, and the internal wall 235 of the connection component 2 abuts and is connected to the internal wall 1115 of the first segment 111 or the second segment 112.

In conclusion, each first segment 111, second segment 112, and connection component 2 may be implemented by using a single-wall structure or a double-wall structure. Herein, the solar module frame 1 disclosed in the present invention is implemented by using the first segment 111 of a double-wall structure, the second segment 112 of a double-wall structure, and the connection component 2 of a single-wall structure. A double-wall structure is used in the first segment 111 and the second segment 112, to further stabilize the solar module frame 1, and enhance the weight bearing capacity and reliability of the frame. When a single-wall structure is used in the connection component 2, the component and opening at the back may be formed at the same time by means of aluminum extrusion or injection molding of plastic for example, and processing such as cutting is not needed. In addition, because a single-wall structure is used in the connection component 2, compared with the double-wall structure, the connection component is lighter, which can save manufacturing costs. In the following description, the first segment 111 and the second segment 112 are of a double-wall structure, and the connection component 2 is of a single-wall structure.

Therefore, the first connection end 21 of the connection component 2 is tightly fit in space surrounded by the external wall 1111, the support wall 1112, the second clamping wall 1114, and the internal wall 1115 of the first segment 111, and the second connection end 22 of the connection component 2 is tightly fit in space surrounded by the external wall 1111, the support wall 1112, the second clamping wall 1114, and the internal wall 1115 of the second segment 112.

In addition, the external wall 231 of the connection component 2 further includes at least one opening (if the connection component 2 is of a double-wall structure, not only the external wall 231 but also the internal wall 235 includes at least one opening, and the opening of the external wall 231 is generally opposite to the opening of the internal wall 235). FIG. 7A to FIG. 7D are schematic views of patterns of the opening of the connection component according to the present invention. As shown in the figures, the connection component 2 has at least one opening, and when the connection component has more than two openings, the support strength of the external wall 231 of the connection component 2 can be enhanced by means of a rib disposed between the openings.

In an embodiment of the present invention, the connection component 2 is made of a plastic material (or another non-conductor), and the first segment 111 and the second segment 112 of the first border 11 are made of a metallic aluminum material (or anther conductor, such as metal or alloy), that is, when the connection component 2 is connected between the first segment 111 and the second segment 112, the electric potential is not continuous. To achieve an integral ground continuity function of the solar module frame 1, in an embodiment of the present invention, the connection component 2 of the solar module frame 1 further includes a metal lead 24. In another embodiment, the first segment 111 and the second segment 112 of the first border 11 may also be made of a plastic material (or another non-conductor), and in this case, the first segment 111 and the second segment 112 may also include a metal lead 24 to achieve integral ground continuity.

Figure 8:
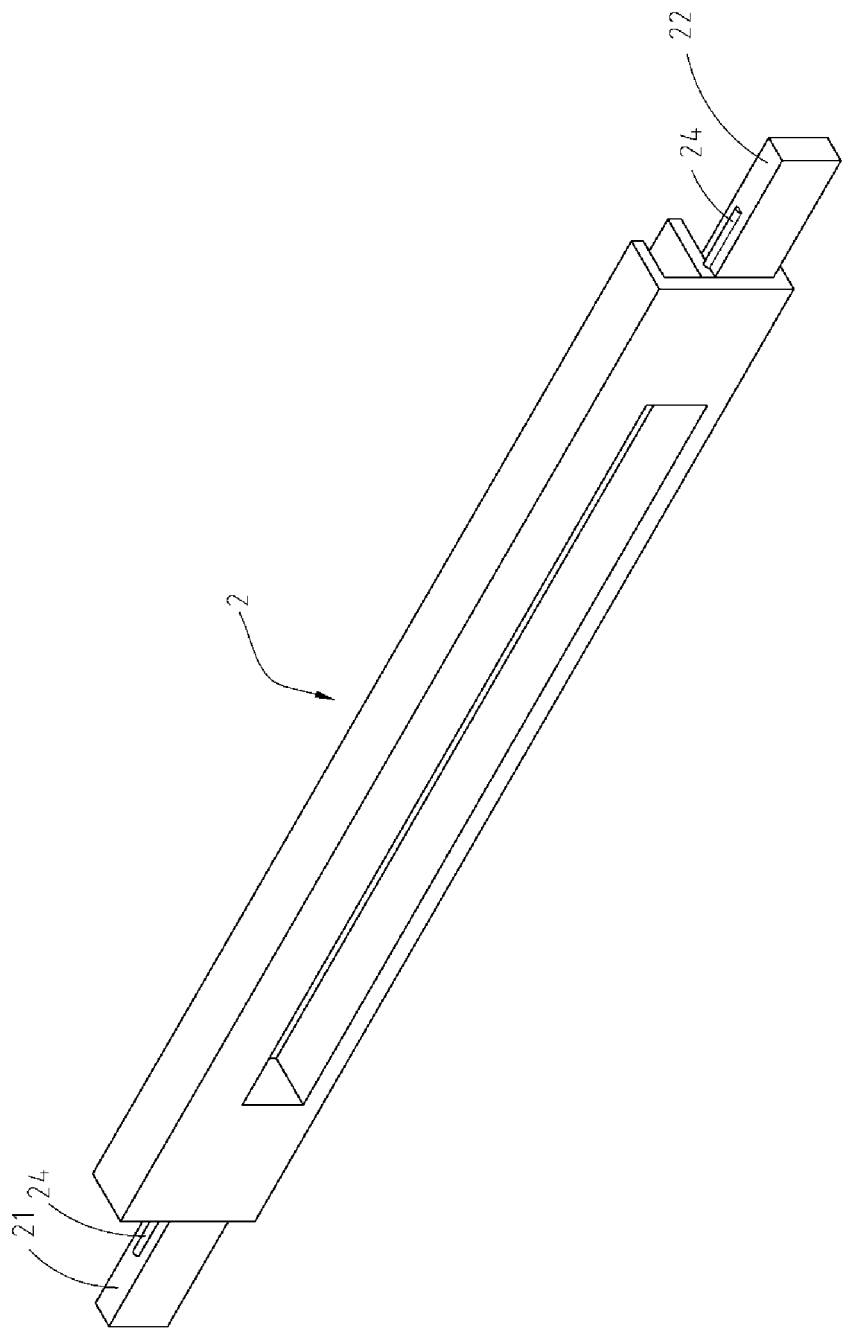
FIG. 8 is a schematic three-dimensional view of a second embodiment of a connection component according to the present invention.
Figure 9:
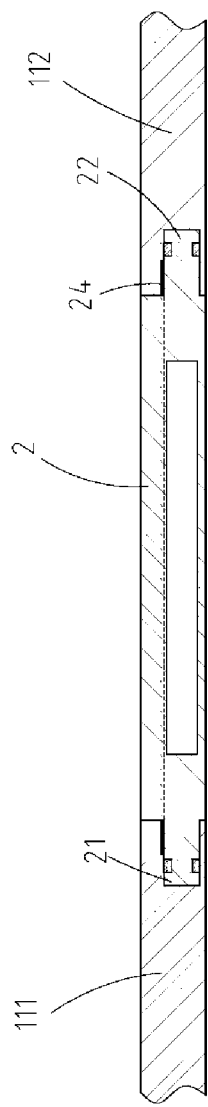
FIG. 9 is a schematic side perspective view of the second embodiment of the connection component according to the present invention.

Referring to FIG. 3, FIG. 8, and FIG. 9, FIG. 8 is s schematic three-dimensional view of a second embodiment of the connection component according to the present invention, and FIG. 9 is a schematic side perspective view of the second embodiment of the connection component according to the present invention. The metal lead 24 is disposed along a length direction of the connection component 2, and one end of the metal lead 24 is exposed at the first connection end 21, and contacts the external wall 1111, the support wall 1112, the second clamping wall 1114, or the internal wall 1115 of the first segment 111 because the first connection end 21 is tightly fit in space surrounded by the external wall 1111, the support wall 1112, the second clamping wall 1114, and the internal wall 1115 of the first segment 111. The other end of the metal lead 24 is exposed at the second connection end 22, and contacts the external wall 1111, the support wall 1112, the second clamping wall 1114, or the internal wall 1115 of the second segment 112 because the second connection end 22 is tightly fit in space surrounded by the external wall 1111, the support wall 1112, the second clamping wall 1114, and the internal wall 1115 of the second segment 112.

In the foregoing description, the connection component 2 is made in an embedded injection molding manner. The metal lead 24 is embedded in the connection component 2, and contacts the first segment 111 or the second segment 112 only through parts which are exposed at the connection ends 21 and 22 of the connection component 2, so as to achieve ground continuity of the solar module frame 1.

In a third embodiment of the connection component 2 according to the present invention, the connection component 2 further includes a pad 25, disposed on the first connection end 21 or the second connection end 22. Referring to FIG. 3, in this embodiment, the pad 25 is a ring-shaped object and is sleeved in a groove of the first connection end 21 or the second connection end 22. The groove is provided to prevent the pad 25 from sliding on the first connection end 21 or the second connection end 22. Herein, the pad 25 is made of an elastic material, such as foamed plastic, but the present invention is not limited thereto.

In addition, in the solar module frame 1 according to an embodiment of the present invention, the first border 11 further includes a first locking hole and a second locking hole. The first locking hole is provided on the first segment 111, and the second locking hole is provided on the second segment 112. Furthermore, the two locking holes may be provided on the external walls 1111 or the support walls 1112 of the first segment 111 and the second segment 112, which depends on the use requirement.

In an embodiment, a distance between the first locking hole and an end, connected to the second border 12, of the first segment 111 is one to three times a distance between the first locking hole and the other end of the first segment 111, and a distance between the second locking hole and an end, connected to the second border 12, of the second segment 112 is one to three times a distance between the second locking hole and the other end of the second segment 112.

In another embodiment, a distance between the first locking hole and an end, connected to the second border 12, of the first segment 111 is 1.5 to 2.5 times a distance between the first locking hole and the other end of the first segment 111, and a distance between the second locking hole and an end, connected to the second border 12, of the second segment 112 is 1.5 to 2.5 times a distance between the second locking hole and the other end of the second segment 112.

In another embodiment, a distance between the first locking hole and an end, connected to the second border 12, of the first segment 111 is twice a distance between the first locking hole and the other end of the first segment 111, and a distance between the second locking hole and an end, connected to the second border 12, of the second segment 112 is twice a distance between the second locking hole and the other end of the second segment 112. However, locations of the locking holes described in the present invention are not limited to the foregoing.

In addition, in an embodiment of the solar module frame according to the present invention, the second border 12 further includes a first locking hole and a second locking hole (not shown in the figure). That is, the locations of the two locking holes and the locations of the openings may be on different borders.

However, it should be noted that, when the connection component 2 of the solar module frame 1 has an opening, deformation of the solar module frame increases as the length and area of the opening increase, and the deformation may vary according to different strength of the selected materials. In an embodiment of the solar module frame 1 according to the present invention, the connection component is made of a plastic material and has an opening, where the length of the opening is a slightly less than the length of the connection component. When the length of the connection component 2 is 200 mm, 300 mm, or 400 mm, the solar module frame 1 is slightly deformed. When the length of the connection component 2 exceeds 400 mm, deformation of the solar module frame 1 increases obviously, but the overall edge part still maintains certain strength. When the length of the connection component continues to increase, the strength of the solar module frame 1 decreases gradually. When the connection component 2 is excessively long (for example, 800 mm), even if the distance between the locking hole and the end, connected to the second border 12, of the first segment 111 and the distance between the locking hole and the other end of the first segment 111 conforms to the foregoing relationship, the mechanical strength of the connection component 2 decreases excessively due to the excessive length of the connection component 2 having the opening, and therefore the solar module frame 1 cannot maintain certain mechanical strength as a whole. In addition, if a rib is added at the opening of the connection component 2, the strength of the connection component 2 may be enhanced, so that the connection component 2 and the opening can be longer.

In another embodiment, at least one first border 11 of the solar module frame 1 includes two connection components 2; in this case, the two connection components 2 may be disposed between the first segment 111 and the second segment 112, so that the first segment 111 and the second segment 112 of the first border 11 are connected by using the two connection components 2. Alternatively, at least one first border 11 of the solar module frame 1 includes a first segment 111, a second segment 112, a third segment, and two connection components 2; in this case, the two connection components 2 are separately disposed between the first segment 111 and the second segment 112, and between the second segment 112 and the third segment.

In conclusion, in the solar module frame according to the present invention, with the workability of a connection component, an opening is provided, so that the problem of heat dissipation at the back of the solar module is solved, and power generation efficiency of the solar module is improved. In addition, in the solar module frame according to the present invention, a connection component having workability is used to replace a part of the original frame; therefore, mechanical strength of the original frame can still be maintained. A single-wall structure is used in the connection component of the solar module frame according to the present invention, which saves more manufacturing costs compared with the conventional overall frame using a double-wall structure.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A solar module frame, comprising two first borders and two second borders, wherein the two first borders are opposite to each other; the two second borders are opposite to each other; at least one first border comprises a first segment and a second segment; one end of the first segment is connected to one end of one second border; and one end of the second segment is connected to one end of the other second border, the solar module frame comprising:
    at least one connection component, comprising a first connection end and a second connection end that are opposite to each other, the first connection end being connected to the other end of the first segment, and the second connection end being connected to the other end of the second segment, wherein
    each of the first segment, the second segment, and the connection component comprises:
    an external wall, having a first side edge and a second side edge parallel to the first side edge;
    a support wall, connected to the first side edge and perpendicular to the external wall;
    a first clamping wall, connected to the second side edge and perpendicular to the external wall; and
    a second clamping wall, perpendicularly connected to the external wall, parallel to the first clamping wall, and at a certain distance from the first clamping wall; and
    each of the first segment and the second segment further comprises:
    an internal wall, perpendicularly connected to the second clamping wall and the support wall, parallel to the external wall, and at a certain distance from the external wall;
    wherein the connection component further comprises a metal lead disposed along a length direction of the connection component; one end of the metal lead is exposed at the first connection end and contacts the external wall, the support wall, the second clamping wall, or the internal wall of the first segment because the first connection end is tightly fit in space surrounded by the external wall, the support wall, the second clamping wall, and the internal wall of the first segment; and the other end of the metal lead is exposed at the second connection end and contacts the external wall, the support wall, the second clamping wall, or the internal wall of the second segment because the second connection end is tightly fit in space surrounded by the external wall, the support wall, the second clamping wall, and the internal wall of the second segment.

2. The solar module frame according to claim 1, wherein the first connection end of the connection component is tightly fit in space surrounded by the external wall, the support wall, the second clamping wall, and the internal wall of the first segment, and the second connection end of the connection component is tightly fit in space surrounded by the external wall, the support wall, the second clamping wall, and the internal wall of the second segment.

3. The solar module frame according to claim 2, wherein the connection component further comprises an internal wall, wherein the internal wall is perpendicularly connected to the second clamping wall and the support wall of the connection component, is parallel to the external wall of the connection component, and is at a certain distance from the external wall of the connection component; the internal wall of the connection component is located between the first connection end and the second connection end; and the internal wall of the connection component is connected to the internal wall of the first segment or the internal wall of the second segment.

4. The solar module frame according to claim 3, wherein each of the external wall and the internal wall of the connection component comprises at least one opening.

5. The solar module frame according to claim 2, wherein the external wall of the connection component comprises at least one opening.

6. The solar module frame according to claim 3, wherein a material of the connection component is plastic, glass, ceramic, carbon fiber, or a combination thereof.

7. The solar module frame according to claim 1, wherein the connection component further comprises a pad, disposed on the first connection end or the second connection end.

8. The solar module frame according to claim 1, wherein the first border further comprises:
    a first locking hole, provided on the first segment; and
    a second locking hole, provided on the second segment.

9. The solar module frame according to claim 8, wherein a distance between the first locking hole and one end, connected to the second border, of the first segment is one to three times a distance between the first locking hole and the other end of the first segment; and a distance between the second locking hole and one end, connected to the second border, of the second segment is one to three times a distance between the second locking hole and the other end of the second segment.

10. The solar module frame according to claim 9, wherein a distance between the first locking hole and one end, connected to the second border, of the first segment is 1.5 to 2.5 times a distance between the first locking hole and the other end of the first segment; and a distance between the second locking hole and one end, connected to the second border, of the second segment is 1.5 to 2.5 times a distance between the second locking hole and the other end of the second segment.

11. The solar module frame according to claim 10, wherein a distance between the first locking hole and one end, connected to the second border, of the first segment is twice a distance between the first locking hole and the other end of the first segment; and a distance between the second locking hole and one end, connected to the second border, of the second segment is twice a distance between the second locking hole and the other end of the second segment.

12. The solar module frame according to claim 1, wherein the second border further comprises a first locking hole and a second locking hole.

13. The solar module frame according to claim 1, wherein a material of the first border is metal, plastic, glass, ceramic, carbon fiber, or a combination thereof.

14. The solar module frame according to claim 1, wherein a material of the second border is metal, plastic, glass, ceramic, carbon fiber, or a combination thereof.

15. The solar module frame according to claim 1, wherein a material of the connection component is metal, plastic, glass, ceramic, carbon fiber, or a combination thereof.

* * * * *